United States Patent [19]

Hurlburt

[11] Patent Number: 5,340,138
[45] Date of Patent: Aug. 23, 1994

[54] OVERSTEER CORRECTION FOR COMPOUND STEERING APPARATUS

[75] Inventor: Joseph C. Hurlburt, Lancaster, Pa.

[73] Assignee: Ford-New Holland, Inc., New Holland, Pa.

[21] Appl. No.: 974,440

[22] Filed: Nov. 12, 1992

[51] Int. Cl.⁵ ............................................. B62D 5/26
[52] U.S. Cl. ..................................... 280/97; 280/113; 280/117; 180/156
[58] Field of Search ............... 280/95.1, 97, 98, 85, 280/89, 109, 113, 117; 180/79.4, 144, 155, 156, 266, 267

[56] References Cited

U.S. PATENT DOCUMENTS

| 2,994,396 | 8/1961 | Bidwell | 180/156 |
| 3,370,670 | 2/1968 | Love | 180/79 |
| 5,046,577 | 9/1991 | Hurlburt | 280/97 |

FOREIGN PATENT DOCUMENTS

1630721  8/1967  Fed. Rep. of Germany .
89/07545 8/1989  PCT Int'l Appl. .

Primary Examiner—Mitchell J. Hill
Assistant Examiner—Paul Dickson
Attorney, Agent, or Firm—Larry W. Miller; Frank A. Seemar

[57] ABSTRACT

A tractor having a steerable axle that pivotally moves laterally in response to a corresponding steering action of the steerable wheels mounted on the steerable axle is disclosed wherein tie rods interconnect a detachable plate carried by the chassis along its centerline with the respective steerable wheels so that the pivotal movement of the steerable wheels effects a corresponding lateral shifting of the steerable axle relative to the chassis. The tie rods are connected to the detachable plate at chassis pivot points spaced, respectively, from the longitudinal centerline of the chassis so that the distance between the connection points between the steerable wheels and the respective tie rods decreases as the steerable axle shifts laterally to correct oversteering of the steerable wheels.

5 Claims, 9 Drawing Sheets

OVERSTEER CORRECTION FOR COMPOUND STEERING APPARATUS

BACKGROUND OF THE INVENTION

This invention relates generally to a steering mechanism for an agricultural tractor in which the front axle is laterally shiftable in response to a steering movement of the steerable wheels and, more particularly, to a tie rod apparatus interconnecting the shiftable front axle and the chassis to transmit steering mechanism movement into axle shifting movement and to provide for an automatic correction of oversteering of the inside wheel during the turning operation.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Supplemental driving power is often provided through the steerable ground engaging wheels, while a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse displacement of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited by tire size and track setting to a given restricted turning angle. This maximum turning angle defines the minimum turning radius of the tractor for a given chassis clearance width, axle oscillation angle, wheel base length and king pin spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length. The mechanism mounting the steerable axle to the vehicle chassis must accommodate the relative lateral movement between the steering axle and the chassis and would preferably maintain the transversely extending axle in a parallel orientation as the axle and chassis move relative to one another in a generally horizontal plane.

The lateral movement of the shiftable axle is preferable automatically accomplished simultaneously and in conjunction with the steering movement imparted to the pivotable wheels by the steering mechanism. Furthermore, oversteering, which occurs when the wheels are pivoted at generally equal angles and, therefore, because of the lateral spacing of the wheels, do not end up with coinciding turning centers, is a problem with steering mechanisms that needs correction as the wheels are being steered.

SUMMARY OF THE INVENTION

It is an object of this invention to overcome the aforementioned disadvantages of the prior art by providing a tie rod connection mechanism between the pivotable axle and the chassis of the tractor to effect a pivotal movement between the chassis and the axle in response to the wheels being steered.

It is another object of this invention to provide an automatic correction of wheel oversteer for a compound steering mechanism.

It is a feature of this invention that the steering mechanism incorporates a pair of tie rods interconnecting the pivotal axle and the chassis at connection points offset from the longitudinal centerline of the chassis.

It is an advantage of this invention that the pivotal movement of the axle relative to the chassis results in a differential pivoting of the opposing wheels to correct oversteering problems.

It is another feature of this invention that the tie rods are connected to a plate detachably affixed to the chassis.

It is another advantage of this invention that the pivotal movement of the axle relative to the plate affixed to the chassis and having connected thereto a pair of opposing tie rods results in a shortening of the linear distance between the remote ends of the respective tie rods as compared to the linear distance between the respective remote ends of the tie rods when the axle is oriented perpendicularly to the longitudinal centerline of the chassis, which corresponds to straight ahead movement of the chassis.

It is still another advantage of this invention that the shortening of the linear distance between the remote ends of the respective tie rods during a turning movement results in a differential pivotal movement of one steerable wheel relative to the other steerable wheel.

It is still another feature of this invention that the amount of differential pivotal movement between the opposing steerable wheels is a function of the distance between the respective chassis connection points of the opposing tie rods and the longitudinal centerline of the chassis.

It is still another object of this invention to provide a tie rod mechanism that would be operable both to effect a pivotal movement of the axle relative to the chassis upon a steering movement of the steerable wheels and to effect an automatic differential pivotal movement of the opposing steerable wheels to correct oversteering problems upon pivotal movement of the axle.

It is yet another object of this invention to provide a tie rod mechanism for a compound steering apparatus which is durable in construction, inexpensive of manufacture, carefree of maintenance, facile in assemblage, and simple and effective in use.

These and other objects, features, and advantages are accomplished according to the instant invention by providing a tractor having a steerable axle that pivotally moves laterally in response to a corresponding steering action of the steerable wheels mounted on the steerable axle wherein tie rode interconnect a detachable plate carried by the chassis along its centerline with the respective steerable wheels so that the pivotal movement of the steerable wheels effects a corresponding lateral shifting of the steerable axle relative to the chassis. The tie rods are connected to the detachable plate at chassis pivot points spaced, respectively, from the longitudinal centerline of the chassis so that the distance between the connection points between the steerable wheels and the respective tie rods decreases as the steerable axle shifts laterally to correct oversteering of the steerable wheels.

BRIEF DESCRIPTION OF THE DRAWINGS

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
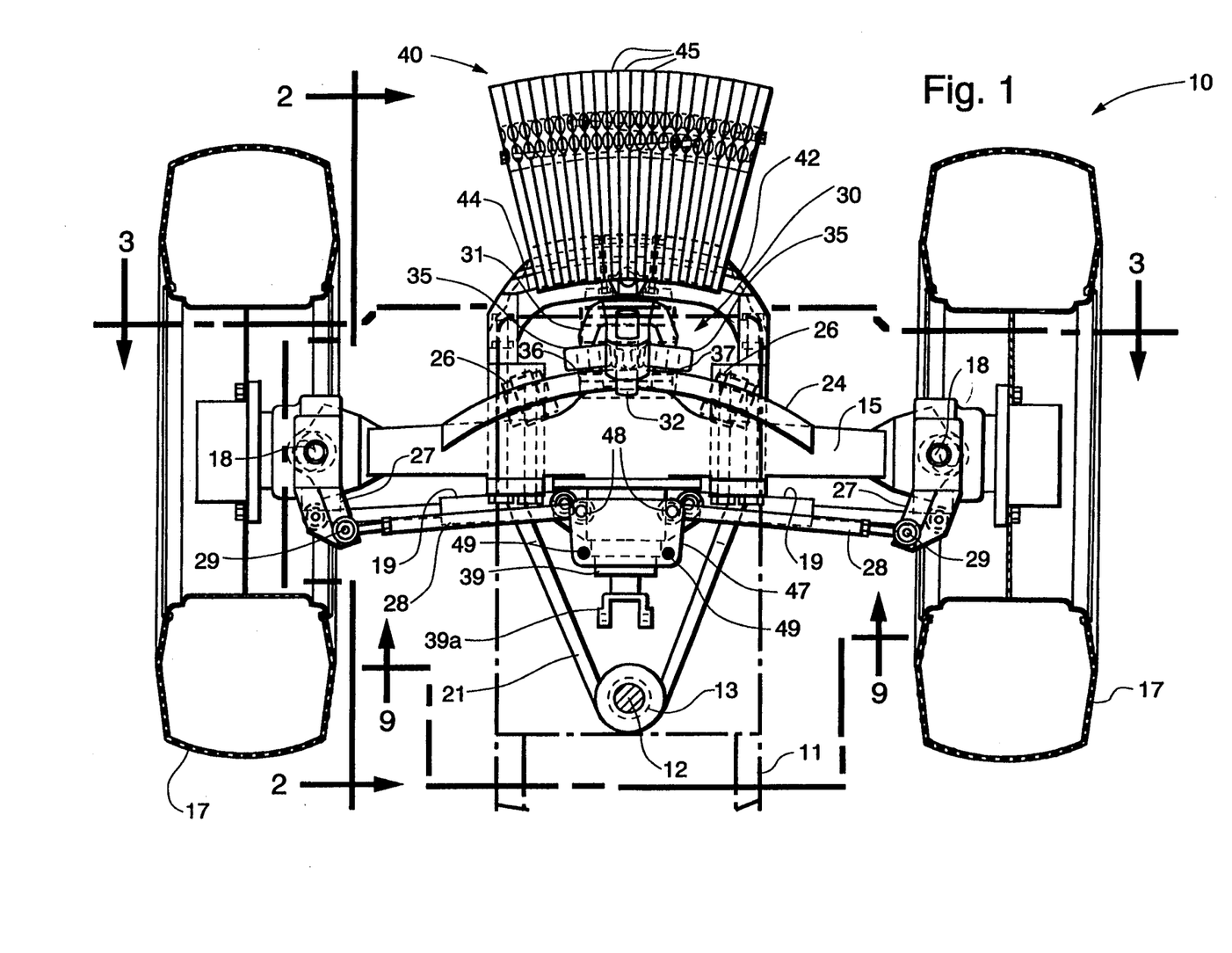
FIG. 1 is a top plan view of a front axle assembly for an agricultural tractor incorporating the principles of the instant invention, the front portion of the tractor chassis overlying the front axle assembly being shown in phantom.
Figure 2:
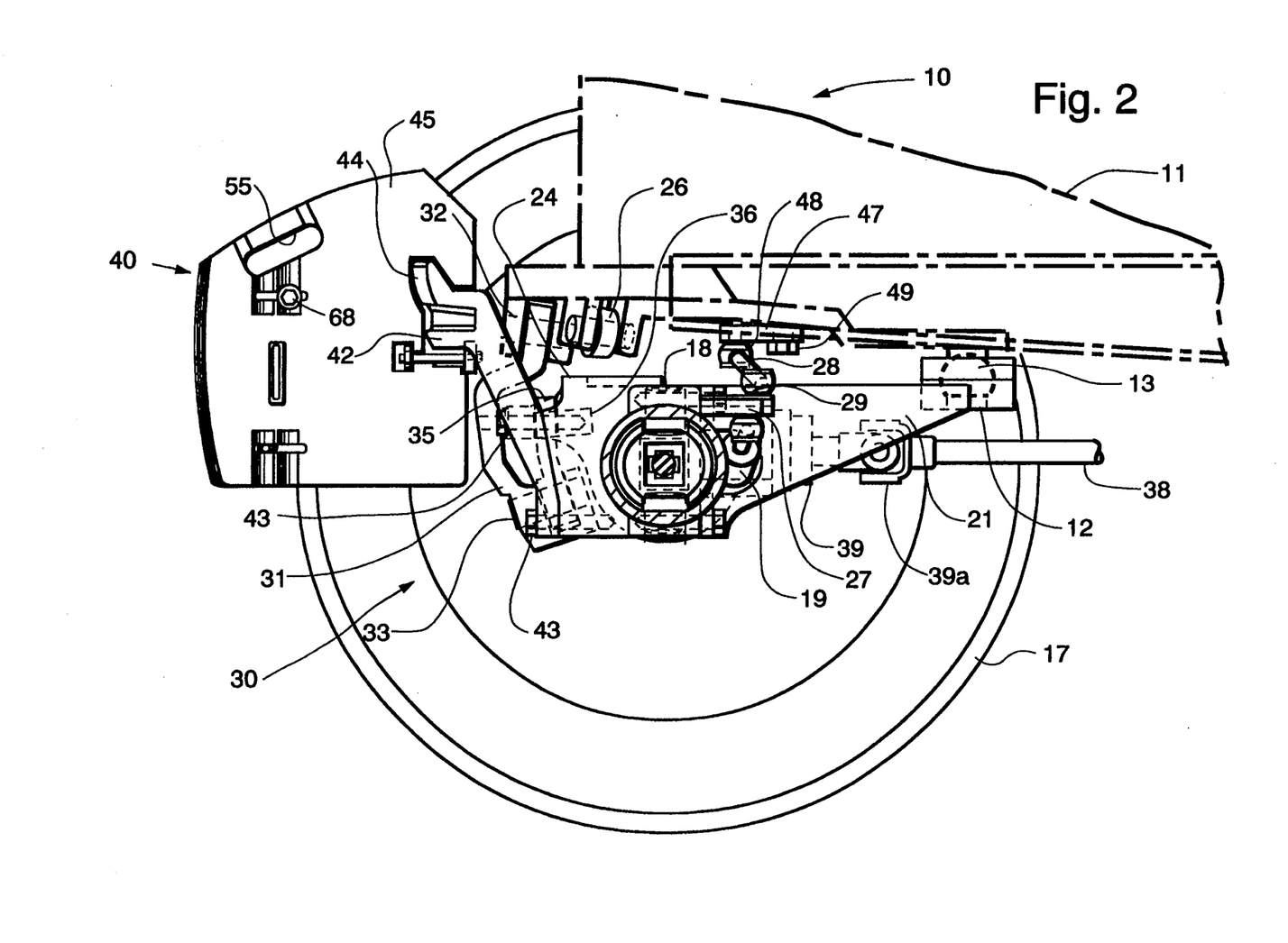
FIG. 2 is a cross-sectional view of the front axle assembly taken along lines 2—2 of FIG. 1, the front portion of the tractor chassis being shown in phantom relative to the front axle assembly.
Figure 3:
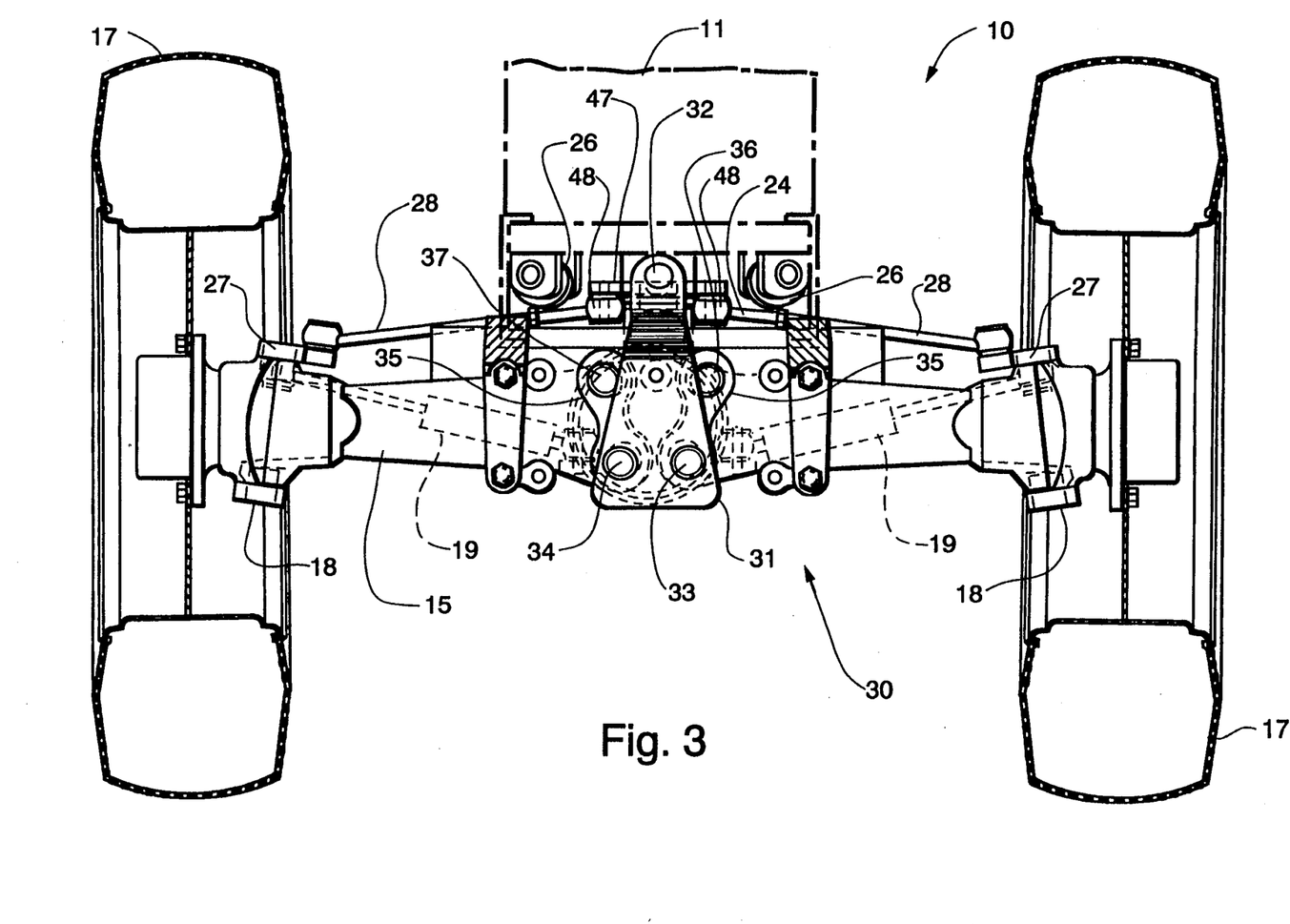
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis 11 to provide a decreased turning radius for an given wheel base, can best be seen. Any left and right references are used as a matter of convenience and are taken from the perspective of standing behind the chassis 11 and looking forwardly in the normal direction of travel. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a spherical ball Joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical king pin axes 18 to effect a steering of the wheels 17 relative to the axle member 15. A pair of hydraulic cylinders 19 interconnect the axle member 15 and the steerable wheels 17 via a steering arm 27 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet generally positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates about a generally horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 in a manner described in greater detail below transmit coordinated steerable movement of the wheels 17 relative to each other and to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced inwardly toward the center of the chassis 11 and rearwardly from the respective pivot axis or king pin 18 for the corresponding steerable wheel 17 by a rearwardly and inwardly extending steering arm 27, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

Figure 4:
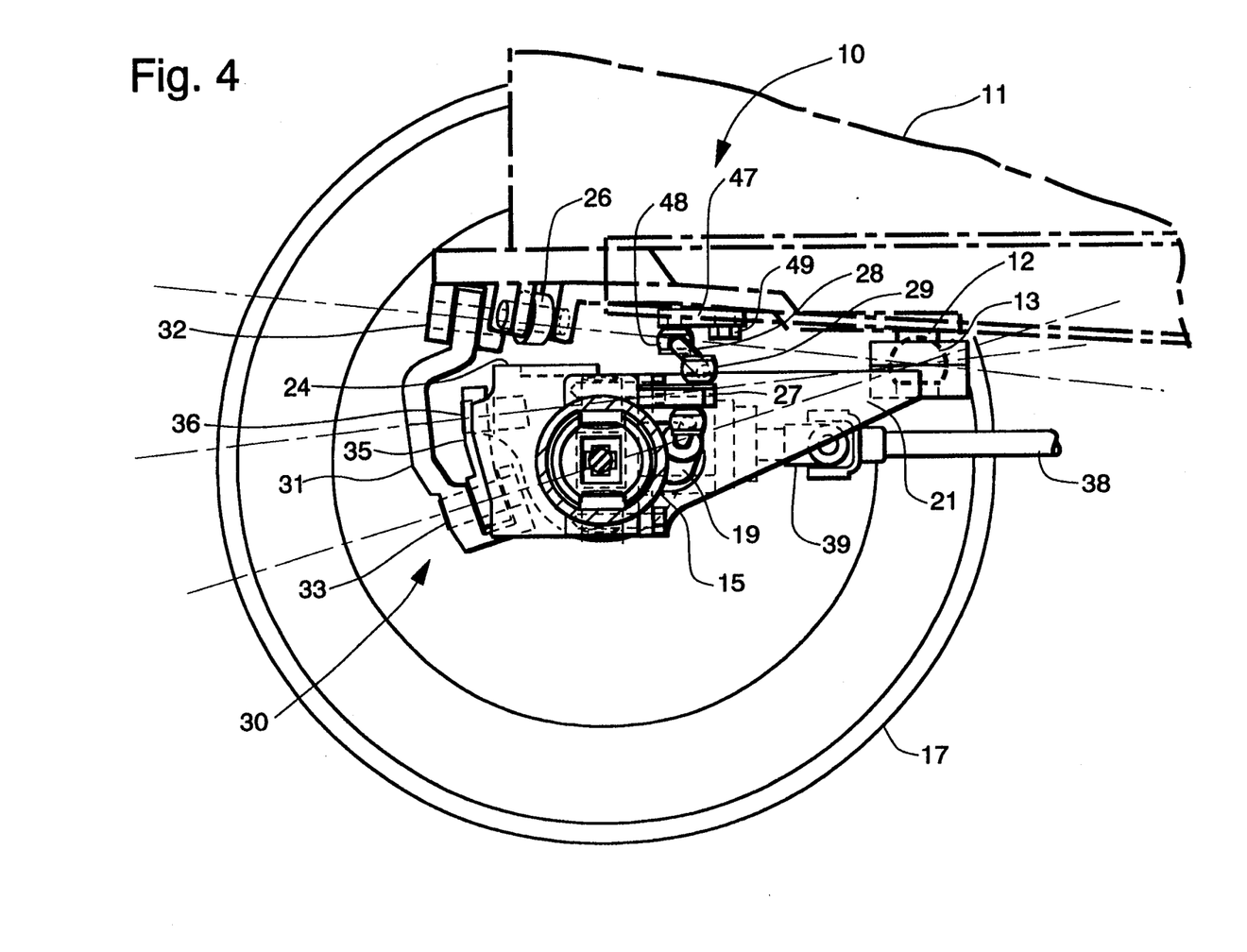
FIG. 4 is a cross-sectional view of the front axle assembly similar to FIG. 2, but with the front ballast assembly removed to better depict the linkage pivotally interconnecting the steerable axle and the vehicle chassis.

The front yoke assembly 30 has a contoured front carrier member 31 pivotally connected at a second pivot joint 32 to the chassis 11. The front carrier member 31 also carries a pair of transversely spaced third and fourth lower pivots 33, 34, respectively, for pivotally supporting a corresponding pair of dog bone-shaped links 35 which, in turn, are pivotally connected to the front axle member 15 by respective transversely spaced fifth and sixth pivots 36, 37. As depicted in FIG. 4, each of the pivots 32, 33, 34, 36 and 37 associated with the front yoke assembly 30 has a corresponding pivot axis aligned with the ball joint 13, which is located on the pivot axis 12. Accordingly, the pivot axis for each of the five pivots 32, 33, 34, 36 and 37 have a nonparallel relationship intersecting a common point at the center of the ball joint 13.

As a result, the pivotal movement of the front axle assembly 10 relative to the tractor chassis 11, resulting in a lateral shifting of the front axle member 15, is accomplished through a four-bar linkage which has very little vertical component associated with the movement thereof, yet the chassis 11 maintains a substantially uniform elevation relative to the front axle 15 throughout the range of relative movement between the front steerable axle and the vehicle chassis. The main pivot axis for lateral shifting and vertical oscillatory movement of the front axle 15 is the axis defined by the second pivot joint 32 extending through the ball joint 13, as both the pivot 32 and the ball joint 13 are fixed relative to the chassis 11. The generally transverse lines defined by the tie rods 28 extend through this main pivot axis extending through pivot 32 and ball joint 13 so that movements of the axle 15, especially oscillatory movements, causes a minimum additional steering effect to the axle 15.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 17 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

The tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 45 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17.

Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 45 to increase the amount of ballast on the front axle 15 without decreasing the tire clearance below that which is acceptable for traditional tractors. Greater detail in the construction and assemblage of the individual weights 45 to form the ballast assembly 40 can be found in U.S. Pat. No. 5,219,180 issued on Jun. 15, 1993, to R. E. Zipser, et al, the descriptive portions of which are incorporated herein by reference.

The configuration of the components of the front yoke assembly 30, chassis 11 and front steerable axle 15, as the tractor steering mechanism 19 effects a turn of the tractor chassis 11, is best seen in FIGS. 5–10. The dog-bone link members 35 diverge upwardly so that the fifth and sixth pivot joints are transversely spaced further apart than the third and fourth lower pivot Joints to provide a nearly parallel planar motion of the chassis 11 relative to the axle 15 and an increased measure of stability to the assembly 30. A turning of the steerable wheels 17, as exemplified by the right turn depicted in FIGS. 6, 8 and 10, causes a corresponding relative shifting between the steerable axle 15 and the chassis 11, which in the frame of reference of the chassis 11 causes a shifting of the axle 15 in the direction of the intended turn. As described above, this relative shifting of the axle 15 shortens the turning radius and allows the tractor to make a tighter turn.

Figure 6:
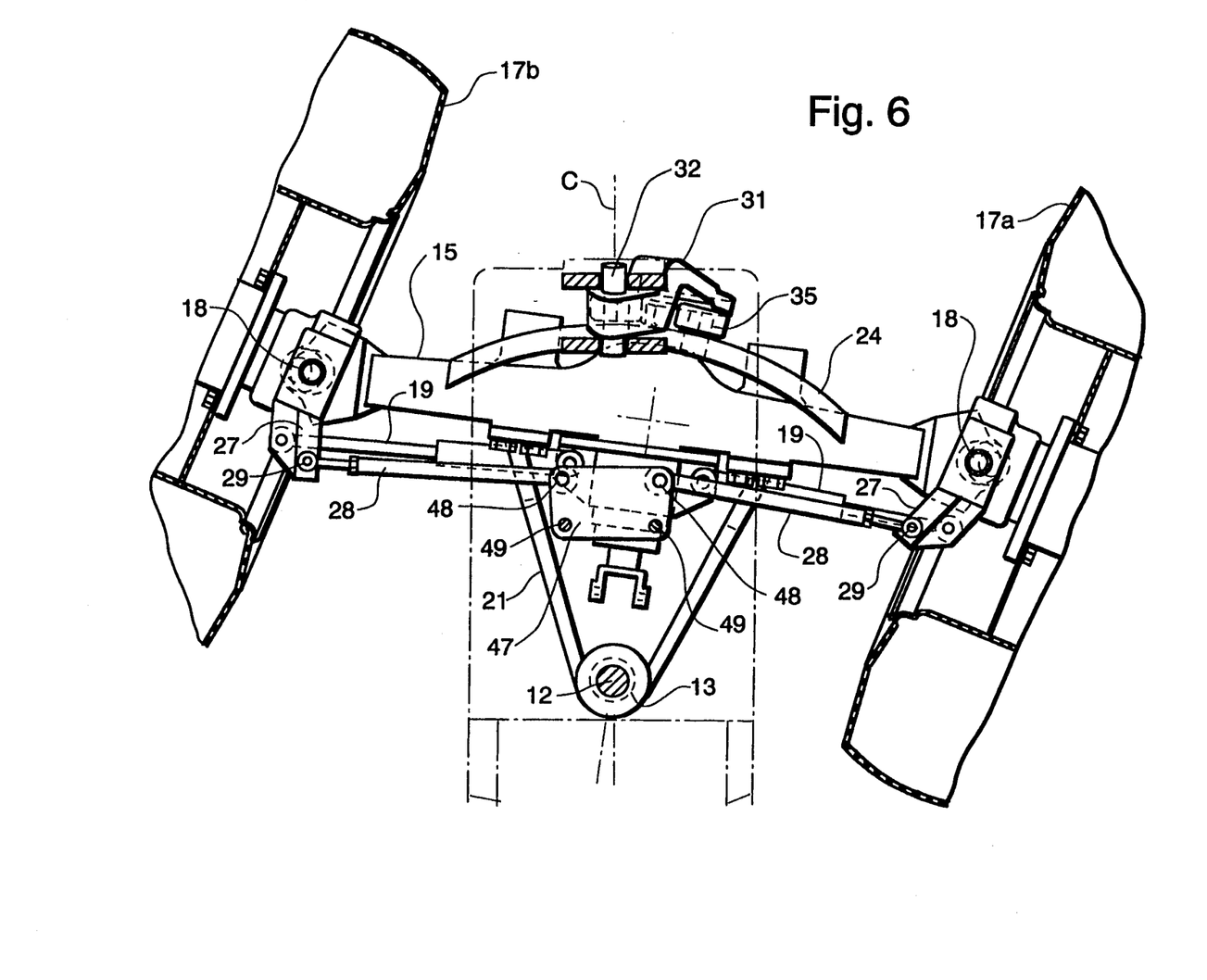
FIG. 6 is a top plan view of the front axle assembly similar to the view of FIG. 5 but with the steerable axle and steerable wheels moved to effect a right turn of the vehicle.
Figure 7:
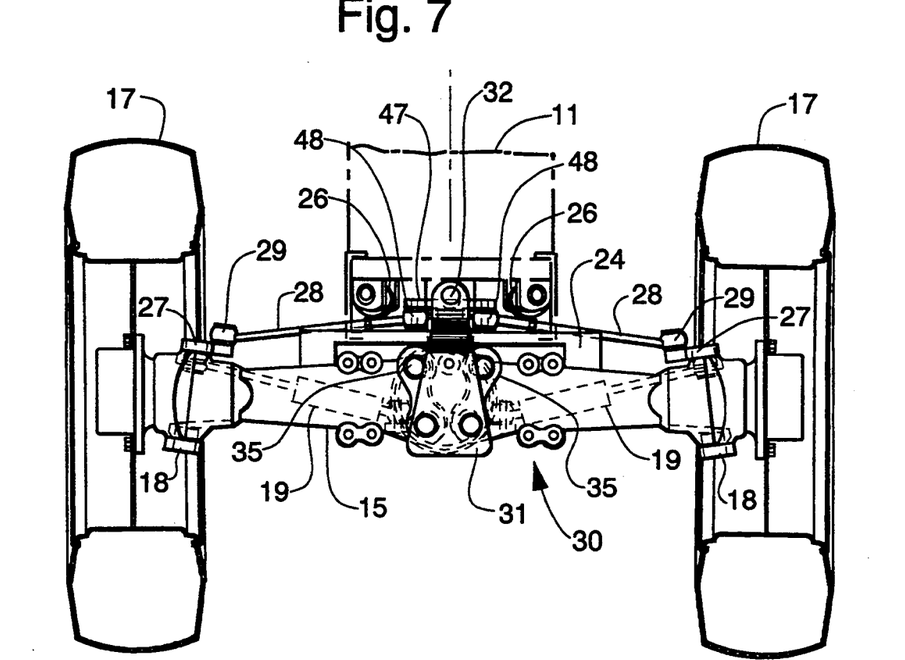
FIG. 7 is a front elevational view of the tractor front axle assembly similar to the view of FIG. 3, but with the front ballast assembly removed for purposes of clarity.
Figure 8:
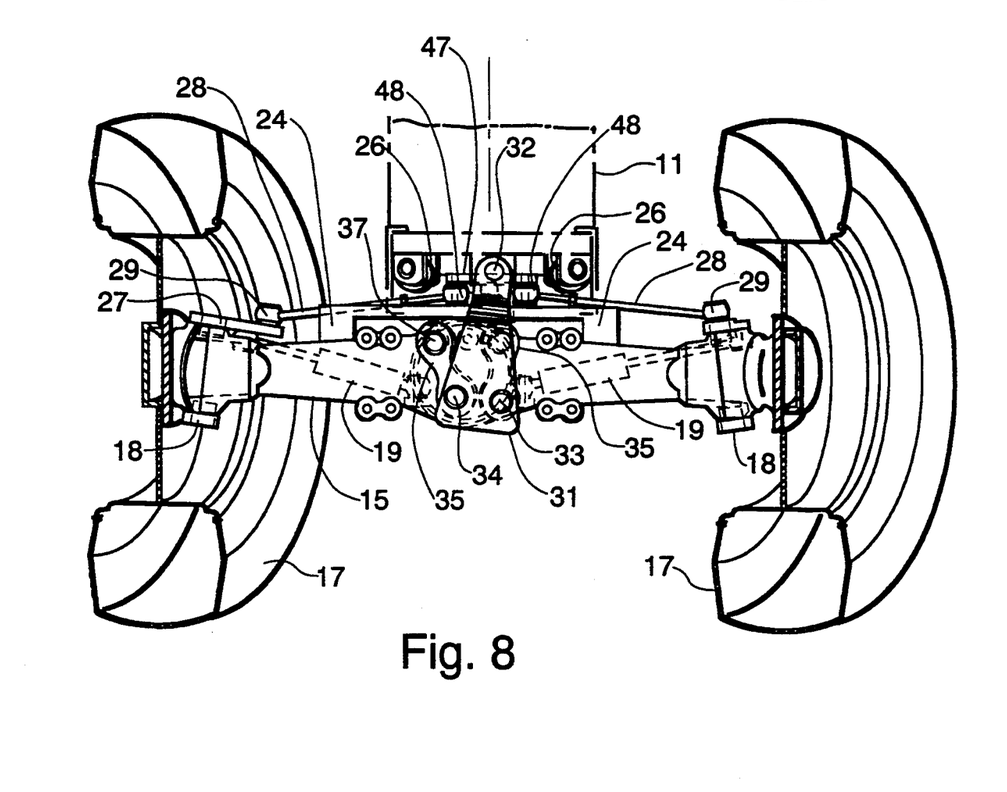
FIG. 8 is a front elevational view of the front axle assembly similar to the view of FIG. 7, but with the steerable axle and steerable wheels moved to effect a right hand turn of the vehicle as depicted in FIG. 6.
Figure 9:
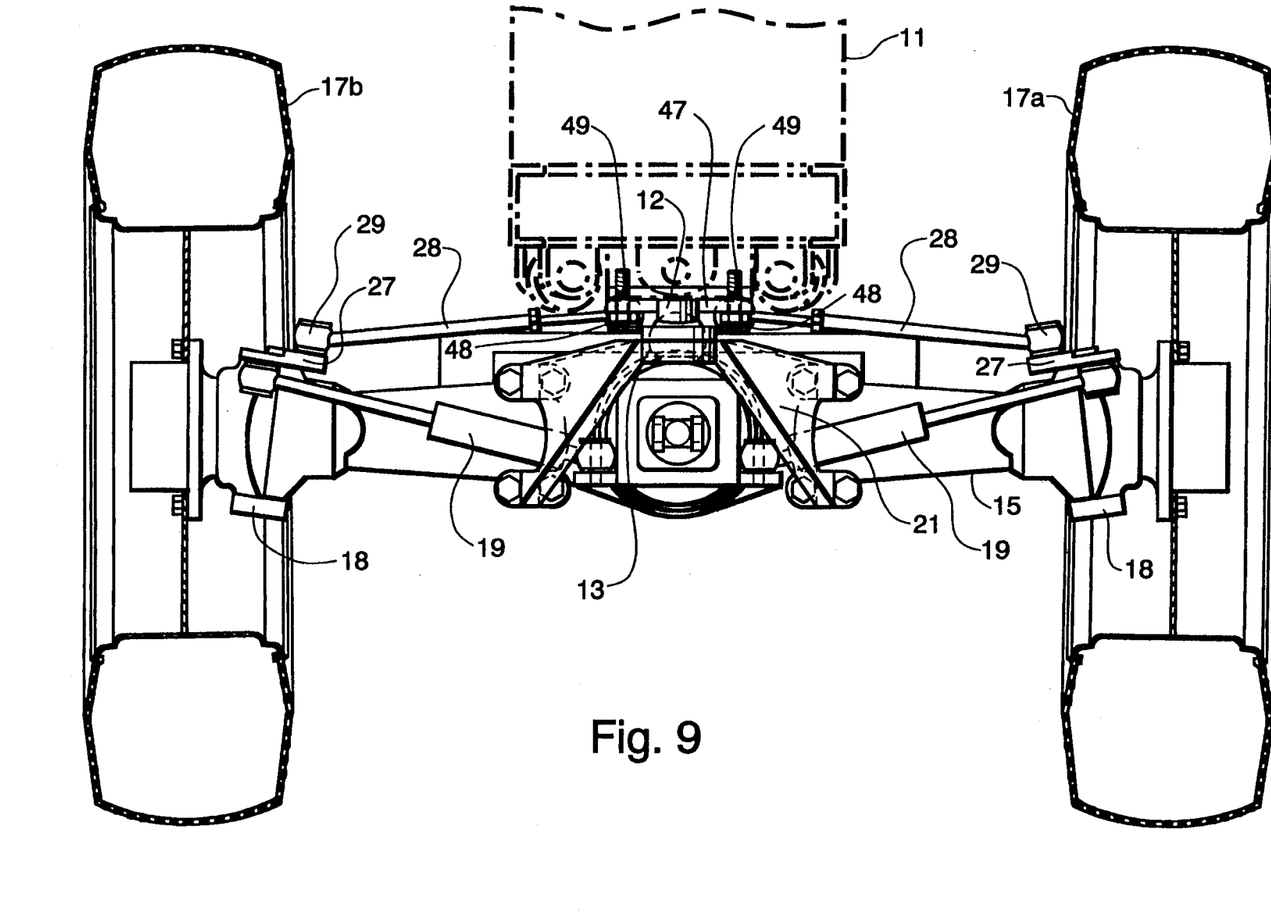
FIG. 9 is a rear elevational view of the front axle assembly taken along lines 9—9 of FIG. 1 with the front ballast assembly removed for purposes of clarity and the chassis being shown in phantom.
Figure 10:
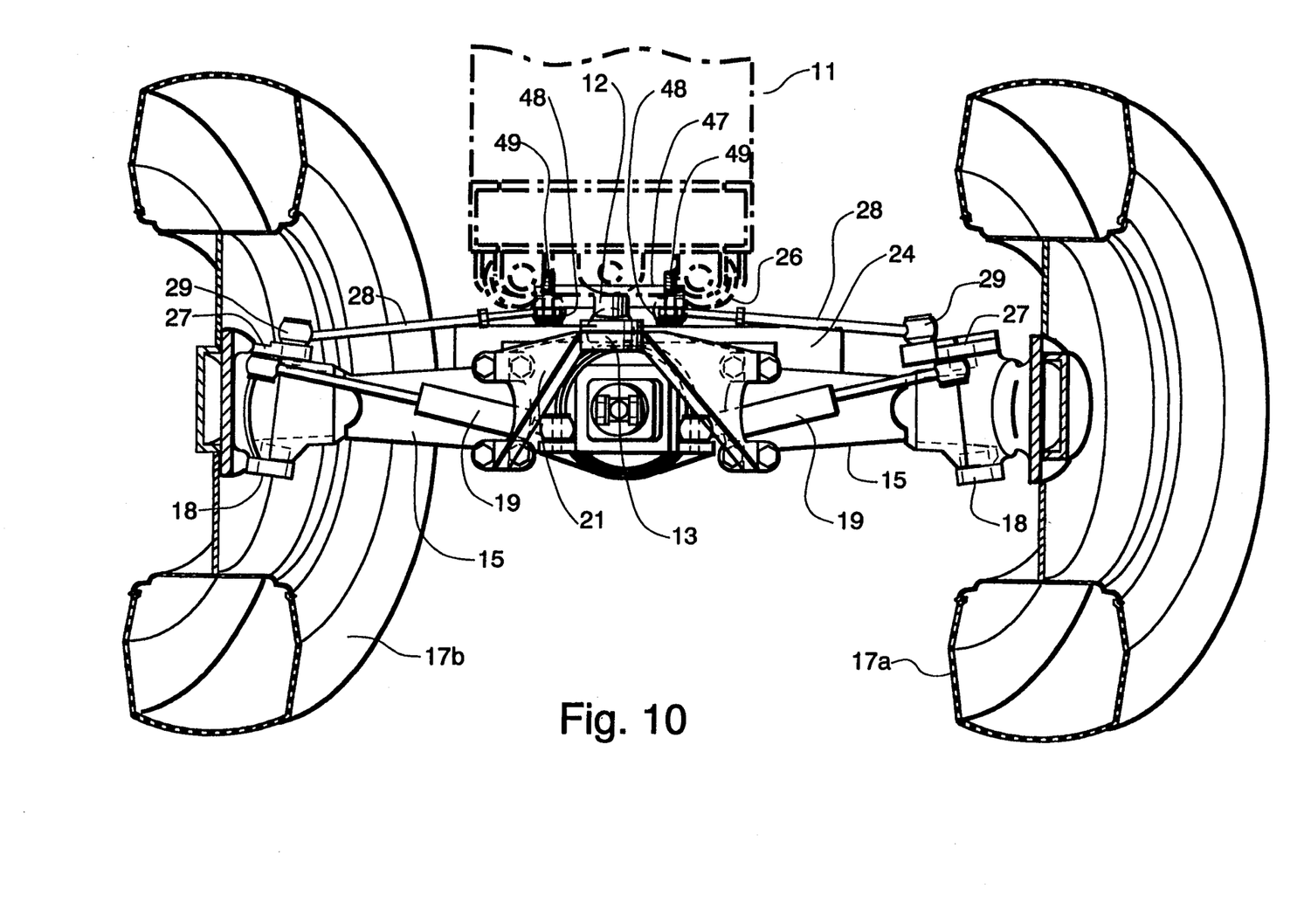
FIG. 10 is a rear elevational view of the front axle as shown in FIG. 9, but with the steerable axle and steerable wheels moved to effect a right hand turn of the vehicle as depicted in FIG. 6.

During such a turn, the tie rods 28 force the chassis 11 in the opposite direction from which the turn is being made, which in the frame of reference of the chassis 11 causes a relative movement of the axle 15 about the first pivot axis 12 into the direction of the turn being made. When the axle 15 moves relative to the chassis 11, the carrier member 31 pivots about its pivotal connection 32 with the chassis 11, as shown in FIGS. 6 and 8, swinging the third and fourth lower pivots 33, 34 and the connected dog-bone link members 35 toward the direction the turn is being made. Because of the configuration of the four pivots 33, 34, 36 and 37 associated with the two link members 35, the fifth and sixth upper pivots 36, 37 swing toward the direction of the turn in an essentially parallel orientation to which they were centrally positioned. As a result, the vertical movement of the axle 15 relative to the chassis 11 is minimized during turns. The disclosed assembly 30 has been found to result in a lowered elevational change of the chassis 11 of approximately a quarter of an inch during turns, and during this minimal vertical movement, the chassis 11 remains in a parallel orientation with respect to its position prior to the turn.

The spherical ball joint 13 at the first pivot 12 accommodates any limited vertical movement of the axle 15 relative to the chassis 11 and allows oscillatory or lateral pitching movement of the axle 15 relative to the chassis 11 about the pivot 32. This oscillatory movement of the axle 15 can cause greater pivotal movement of the carrier member 31 about the pivot 32 than is shown in FIGS. 6 and 8. This particular configuration of components pivotally mounting the axle 15 to the chassis 11 for relative lateral movement results in a minimum of elevational changes for the chassis, irrespective of the movement of the axle 15, which in turn provides the ability to utilize front mounted attachments for the chassis 11 without affecting their operation during turns. Furthermore, the respective tie rods 28 are oriented such that the inwardly extending line of each of the tie rods 28 from the connection point 29 will intersect with the pivot axis extending between the pivot joint 32 and the center of the ball joint 13. This orientation of the tie rods 28 minimizes any steering effect to the wheels 17 whenever the axle 15 oscillates relative to the chassis 11.

The centering of all the pivot axes associated with the pivot joints 32, 33, 34, 36 and 37 at the center of the ball joint 13 allows the unrestricted pivotal movement of the carrier member 31 and the dog-bone link members 35 during the turning movements and for oscillatory or pitching movements as well, without requiring additional motion components to be accommodated during the relative movement of the axle 15 and the chassis 11. It will be understood by one skilled in the art that the specific orientation of these respective pivots 32, 33, 34, 36 and 37 requires the formation of a specially formed carrier member 31 and dog-bone members 35 to orient properly the respective pivots. Furthermore, the carrier member 31 has a somewhat arcuate shape to bow out around the dog-bone members 35 for their unrestricted movement between the carrier member 31 and the axle 15.

As best seen in FIGS. 1, 5–7, 9 and 10, the opposing tie rods 28 are pivotally connected at chassis connection points 48 to a plate 47 detachably affixed to the chassis 11 by fasteners 49 in a manner centered on the longitudinal centerline C of the chassis 11 rearwardly of the axle 15. The chassis connection points 48 are offset laterally from the chassis centerline C and, as the pivot connection points 29, are formed as ball joints to accommodate universal movement of the tie rods 28. Any pivotal movement of the axle 15 relative to the chassis 11 will also be relative the plate 47 which is detachably affixed to the chassis 11.

Since the interior chassis connection points 48 are fixed to the chassis 11, the stroking of the hydraulic cylinders 19 to pivotally rotate the opposing wheels 17 about their respective king pins 18 results in pivotal movement of the axle 15 about the pivot axis 12, in the manner described above, because of the fixed distance between the chassis connection point 48 and the corresponding pivot connection point 29 imposed by the respective tie rods 28. Accordingly, the tie rods 28 being fixed between the wheels 17 and the chassis 11 effect the relative pivotal movement between the axle 15 and the chassis 11 to improve the steering characteristics.

Figure 5:
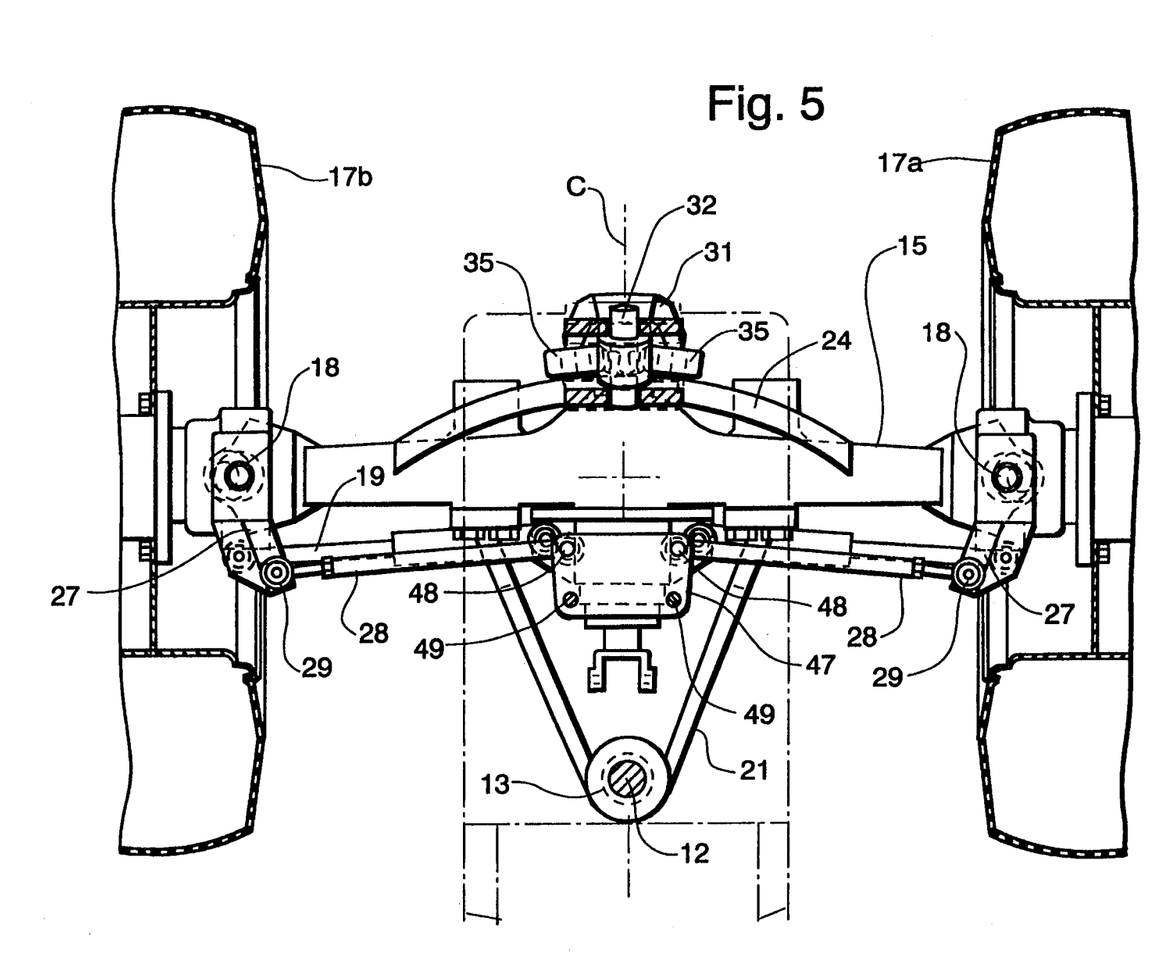
FIG. 5 is a top plan view of the front axle assembly similar to the view of FIG. 1, but with the front ballast assembly removed for purposes of clarity.

Referring specifically to the top plan views of the front axle assembly shown in FIGS. 5 and 6, one skilled in the art will readily see that the linear distance between the respective pivot connection points 29 for the tie rods 28, when the chassis is being directed in a straight longitudinal direction as depicted in FIG. 5, is a given distance. The pivotal rotation of the axle 15 relative to the plate 47, as representatively depicted in FIG. 6, results in a shortening of this linear distance between the respective pivot connection points 29.

This shortening of the linear distance between respective pivot connection points 29 can be visualized from the reference point of the axle 15 looking at the plate 47. From this orientation, the pivotal movement of the axle 15 about the pivot 12 appears to result in a rotation of the plate 47 and a corresponding relative toggling of the tie rods 28. This angular toggling of the tie rods 28 results in a physical shortening of the linear distance between the respective pivot connection points 29.

Looking then at the inside wheel 17a from the perspective of the outside wheel 17b during a turning movement, which as representatively depicted in FIG. 6 would be to look at the right wheel 17a from the perspective of the left wheel 17b, this shortening of the linear distance between the respective pivot connection points 29 increases the relative pivotal movement of the inside wheel 17a to correct the oversteering problem by aligning the turning centers of the respective wheels 17a, 17b.

The amount of shortening of this linear distance between respective pivot connection points 29 is a function of the normal linear distance between the pivot connection points 29 and the distance the chassis connection points 48 are offset from the longitudinal centerline C of the chassis. One skilled in the art would readily realize that the placement of the chassis connection points 48 on the longitudinal centerline C would result in no shortening of the linear distance between the pivot connection points 29 as the axle 15 pivots relative to the chassis 11. The amount of offset of the chassis connection points 48 from the longitudinal centerline C of the chassis 11 needs to be carefully chosen to result in the proper amount of differential pivotal movement of the wheels 17 as the axle 15 rotates about the pivot 12 to keep the turn centers of the respective wheels 17a, 17b coincidental, thereby correcting oversteering problems automatically as the vehicle executes a turning movement.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A vehicle comprising:
   a chassis having a generally longitudinally extending centerline;
   a transversely extending steerable axle pivotally mounted to said chassis for lateral movement relative to said chassis about a generally vertically extending axis;
   a pair of opposing steerable wheels pivotally connected to the respective transverse ends of said steerable axle for pivotal movement relative thereto about respective wheel pivot axes;
   steering means operatively connected to said steerable wheels to control the pivotal movement thereof relative to said steerable axle;
   a detachable plate affixed to said chassis along said longitudinally extending centerline; and
   a pair of tie rods, each tie rod interconnecting one of said steerable wheels at a steering arm connection point spaced remotely from the corresponding said wheel pivot axis and said detachable plate at respective chassis pivot points carried by said detachable plate at locations spaced on opposing sides of said chassis centerline for effecting a lateral shifting of said chassis relative to said steerable axle upon the pivotal movement of said steerable wheels relative to said steerable axle and for effecting a difference in the pivotal movement of one steerable wheel relative to the other steerable wheel, said detachable plate and said tie rods being removable from said chassis as a unit.

2. The vehicle of claim 1 wherein the distance between the respective said steering arm connection points decreases as said steerable axle moves laterally relative to said chassis, thereby effecting a difference in the pivotal movement of one steerable wheel relative to the other steerable wheel.

3. The vehicle of claim 2 wherein all of said chassis pivot points and said steering arm connection points comprise ball joints to accommodate transverse pitching motion of said steerable axle relative to said chassis.

4. In a vehicle having a chassis having a generally longitudinally extending centerline, a transversely extending steerable axle pivotally mounted to said chassis for lateral movement relative to said chassis about a generally vertically extending axis, a pair of opposing steerable wheels pivotally connected to the respective transverse ends of said steerable axle for pivotal movement relative thereto about respective wheel pivot axes, and steering means operatively connected to said steerable wheels to control the pivotal movement thereof relative to said steerable axle, the improvement comprising:

a detachable plate affixed to said chassis along said longitudinally extending centerline; and a pair of tie rods, each tie rod interconnecting said detachable plate and one of said steerable wheels, each said tie rod having a first end pivotally connected to said detachable plate at a chassis pivot point spaced transversely from said longitudinally extending centerline and a second end pivotally connected to the respective steerable wheel at a steering arm connection point spaced remotely from the corresponding said wheel pivot axis, the distance between the respective said steering arm connection points decreasing as said steerable axle moves laterally relative to said chassis, thereby effecting a difference in the pivotal movement of one steerable wheel relative to the other steerable wheel.

5. The vehicle of claim 4 wherein said detachable plate and said tie rods are disconnectable from said chassis and said steerable wheels to be removable from said vehicle as a unit.

* * * * *